(12) United States Patent
Klein et al.

(10) Patent No.: US 7,412,718 B2
(45) Date of Patent: Aug. 12, 2008

(54) METHOD FOR BIDIRECTIONAL DATA TRANSFER

(75) Inventors: Steven Edward Klein, Tucson, AZ (US); James Chien-Chiung Chen, Tucson, AZ (US); Patricia Ching Lu, Fremont, CA (US); Minh-Ngoc Le Huynh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 10/721,048

(22) Filed: Nov. 20, 2003

(65) Prior Publication Data

US 2005/0114702 A1 May 26, 2005

(51) Int. Cl.
*H04L 9/32* (2006.01)

(52) U.S. Cl. .............................. 726/4; 726/14; 370/405; 370/406

(58) Field of Classification Search .................... 726/4, 726/14

See application file for complete search history.

(56) References Cited

U.S. PATENT DOCUMENTS

| | | | |
|---|---|---|---|
| 6,014,383 A * | 1/2000 | McCarty | 370/453 |
| 6,112,276 A | 8/2000 | Hunt et al. | |
| 6,148,004 A | 11/2000 | Nelson et al. | |
| 6,219,753 B1 | 4/2001 | Richardson | |
| 6,243,386 B1 | 6/2001 | Chan et al. | |
| 6,310,884 B1 | 10/2001 | Odenwald, Jr. | |
| 6,529,963 B1 | 3/2003 | Fredin et al. | |

FOREIGN PATENT DOCUMENTS

JP 2003085017 A 3/2003

OTHER PUBLICATIONS

"Fibre Channel Framing and Signaling", INCITS working draft proposed American National Standard of Accredited Standards Committee, Apr. 9, 2003, Chapter 12.
G. Castets et al., "IBM TotalStorage Enterprise Storage Server Implementing ESS Copy Services with IBM e server zSeries", IBM Corporation, Document No. SG24-5680-01, Apr. 2003, Chap. 1.

* cited by examiner

*Primary Examiner*—Gilberto Barron
*Assistant Examiner*—Jung Kim
(74) *Attorney, Agent, or Firm*—Rabindranath Dutta; Konrad Raynes & Victor LLP

(57) ABSTRACT

Provided are a method, system and article of manufacture for bidirectional data transfer. In certain embodiments a link layer login is sent from a first port to a second port. Subsequently, an application layer login is sent from the first port to the second port to establish a first data path, wherein the first data path is from the first port to the second port. Subsequently, another application layer login is sent from the second port to the first port to establish a second data path, wherein the second data path is from the second port to the first port. In certain other embodiments, a first data path is established from a first port to a second port. A determination is made at the first port, whether the second port has a second data path established from the second port to the first port. An application layer logout is sent from the first port to the second port, in response to determining that the second port has the second data path established from the second port to the first port. The first data path is terminated from the first port to the second port in response to receiving the application layer logout at the second port.

8 Claims, 7 Drawing Sheets

| EVENT | OLD STATE | NEW STATE |
|---|---|---|
| Receive Link Layer Logout (LOGO) | Not logged in | Not logged in |
| | PLOGI | Not logged in |
| | PRLI as pri. | Not logged in |
| | PRLI as sec. | Not logged in |
| | PRLI as pri/sec | Not logged in |
| Receive Application Layer Logout (PRLO) | Not logged in | Not logged in |
| | PLOGI | PLOGI |
| | PRLI as pri. | PRLI as pri. |
| | PRLI as sec. | PLOGI |
| | PRLI as pri/sec | PRLI as pri. |
| Receive Link Layer Login (PLOGI) | Not logged in | PLOGI |
| | PLOGI | PLOGI |
| | PRLI as pri. | PLOGI |
| | PRLI as sec. | PLOGI |
| | PRLI as pri/sec | PLOGI |
| Receive Application Layer Login (PRLI) | Not logged in | Not logged in |
| | PLOGI | PRLI as sec. |
| | PRLI as pri. | PRLI as pri/sec |
| | PRLI as sec. | PRLI as sec |
| | PRLI as pri/sec | PRLI as pri/sec |
| Fibre Channel Link is Down | Not logged in | Not logged in |
| | PLOGI | Not logged in |
| | PRLI as pri | Not logged in |
| | PRLI as sec | Not logged in |
| | PRLI as pri/sec | Not logged in |

FIG. 6

METHOD FOR BIDIRECTIONAL DATA TRANSFER

BACKGROUND

1. Field

The present invention relates to a method, system, and an article of manufacture for bidirectional data transfer.

2. Description of the Related Art

Fibre channel networks may be used in storage area networking (SAN) environments to attach servers and storage. In certain implementations, fibre channel networks may also be used to allow for peer-to-peer connections between storage devices. Fiber channel networks may be classified into a variety of topologies. In a point-to-point topology, each pair of network components are connected via dedicated links. In an arbitrated loop topology, groups of network components are connected via a loop. In a switched fabric topology, network components are connected via switches.

Certain networked information technology systems, including storage systems, may need protection from site disasters or outages. Implementations for protecting from site disasters or outages may include mirroring or copying of data in storage systems. Such mirroring or copying of data may involve interactions among hosts, storage systems and connecting networking components of the information technology system.

An enterprise storage server* (ESS) may be a disk storage server that includes one or more processors coupled to storage devices, including high capacity scalable storage devices, Redundant Array of Independent Disks (RAID), etc. The enterprise storage servers may be connected to a network, such as a fibre channel network, and include features for copying data in storage systems. Peer-to-Peer Remote Copy (PPRC) is an ESS copy function that allows the shadowing of application system data from a first site to a second site. The first site may be referred to as an application site, a local site, or a primary site. The second site may be referred to as a recovery site, a remote site, or a secondary site. In certain implementations, the first and second sites may be coupled via a PPRC link implemented via a fibre channel link coupled to a fibre channel network.

*Enterprise storage server (ESS) is a trademark of IBM corporation.

SUMMARY OF THE PREFERRED EMBODIMENTS

Provided are a method, system and article of manufacture for bidirectional data transfer. In certain embodiments a link layer login is sent from a first port to a second port. Subsequently, an application layer login is sent from the first port to the second port to establish a first data path, wherein the first data path is from the first port to the second port. Subsequently, another application layer login is sent from the second port to the first port to establish a second data path, wherein the second data path is from the second port to the first port.

In additional embodiments, a determination is made that the second port has an initiated link layer login to the first port, prior to sending the another application layer login from the second port to the first port. The second port is restricted from sending another link layer login to the first port, wherein sending the another link layer login would cause a termination of the established first data path from the first port to the second port.

In yet further embodiments, the second port is restricted from sending the another application layer login to the first port in response to determining that the second port has an initiated link layer login to the first port, wherein restricting the second port causes a retention of the established first data path from the first port to the second port, and wherein restricting the second port and sending the another application layer login causes bidirectional data transfer to take place between the first and second ports.

In certain additional embodiments, a bidirectional data transfer application prevents the second port from sending another link layer login to the first port, wherein sending the another link layer login would cause a termination of the first data path.

In further embodiments, the method may be performed by one or more bidirectional data transfer applications that are implemented in first and second fibre channel adapters coupled to the first and second ports respectively, wherein the first and second fibre channel adapters are coupled to first and second storage controllers respectively, and wherein the first and second ports are coupled via one fibre channel link associated with the first and second data paths.

In certain other embodiments, a first data path is established from a first port to a second port. A determination is made at the first port, whether the second port has a second data path established from the second port to the first port. An application layer logout is sent from the first port to the second port, in response to determining that the second port has the second data path established from the second port to the first port. The first data path is terminated from the first port to the second port in response to receiving the application layer logout at the second port.

In additional embodiments, terminating the first data path from the first port to the second port does not terminate the second data path from the second port to the first port.

In further embodiments, a bidirectional data transfer application prevents the first port from sending a link layer logout to the first port, wherein sending the link layer logout would cause a termination of the first and second data paths.

In yet additional embodiments, the method is performed by one or more bidirectional data transfer applications that are implemented in first and second fibre channel adapters coupled to the first and second ports respectively, wherein the first and second fibre channel adapters are coupled to first and second storage controllers respectively, and wherein the first and second ports are coupled via one fibre channel link associated with the first and second data paths.

In further embodiments, the application level logout is sent via an application level logout frame, and wherein the first and second ports are capable of sending and receiving a link level login frame, a link level logout frame, an application level login frame and the application level logout frame over a fibre channel connection coupling the first and second ports.

Certain embodiments allow bidirectional data transfer across a single fibre channel link that couples two storage control units. In certain additional embodiments implemented in a fibre channel PPRC environment, peer storage control units may participate in a PPRC relationship and perform bidirectional data transfer. At each end of a PPRC link, the same fibre channel adapter may concurrently function as a PPRC primary and a PPRC secondary.

BRIEF DESCRIPTION OF THE DRAWINGS

Referring now to the drawings in which like reference numbers represent corresponding parts throughout:

FIG. 6 illustrates a block diagram that includes states in a fibre channel adapter, in accordance with certain described implementations of the invention.

DETAILED DESCRIPTION

In the following description, reference is made to the accompanying drawings which form a part hereof and which illustrate several implementations. It is understood that other implementations may be utilized and structural and operational changes may be made without departing from the scope of the present implementations.

Peer to Peer Remote Copy and Unidirectional Data Transfer

In certain PPRC implementations, two remote data centers that are both primary and secondary to each other may not share a single fibre channel link to back up data concurrently in both directions. Certain implementations to back up data in both directions over fibre channel may require two dedicated fibre channel links between the two remote data centers, where different fibre channel links are used for data traveling in each direction. Not sharing a single fibre channel link for bidirectional data transfer may result in the added cost of acquiring and maintaining two separate physical fibre channel links. In particular, if the fibre channel links are over long distances the added cost may be significant. Furthermore the PPRC implementations may not be taking advantage of the full duplex capabilities of fibre channel links. Certain embodiments of the invention make it possible to utilize twice the bandwidth of a single fibre channel link between the two data centers if data is sent in both directions, i.e., sending data bidirectionally over a fibre channel link may double the bandwidth of the fibre channel link in comparison to implementations in which data is transmitted in a single direction in the fibre channel link.

Bidirectional Data Transfer Embodiments

Figure 1:
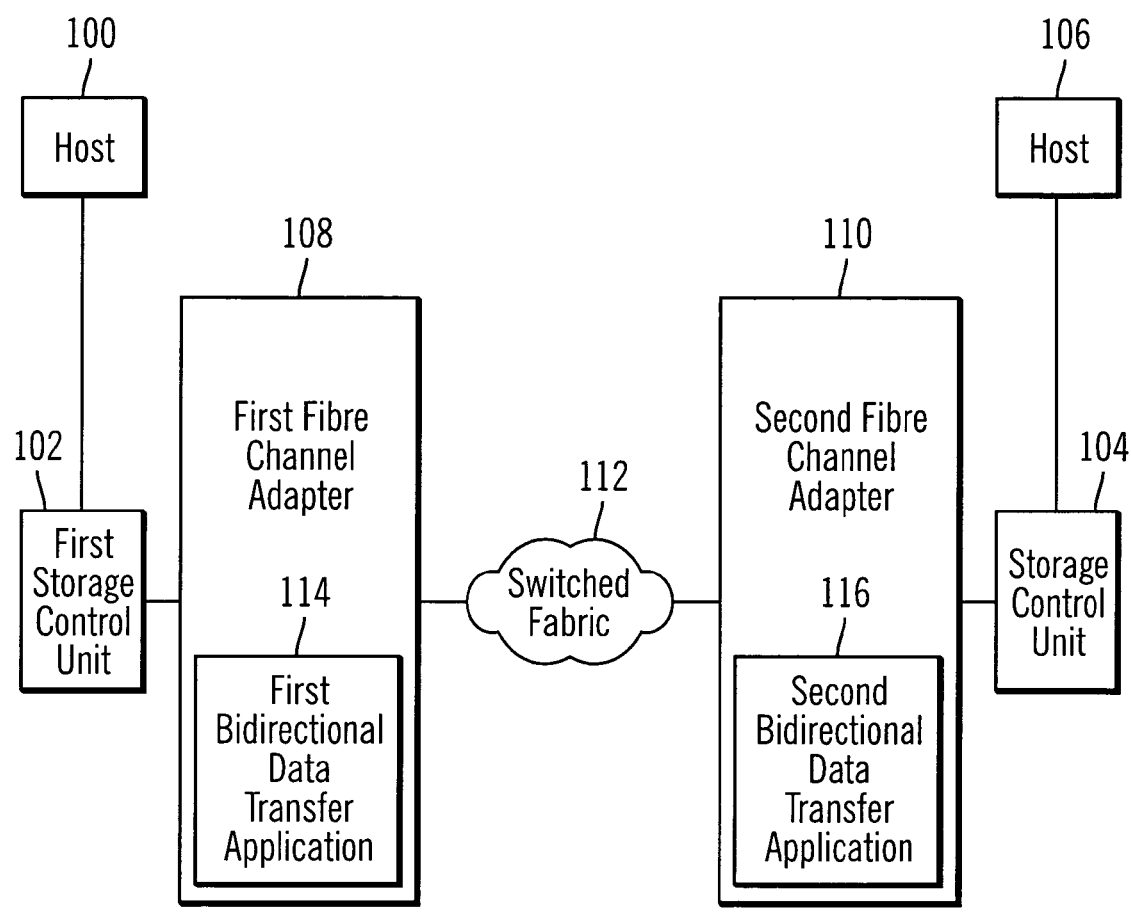
FIG. 1 illustrates a block diagram of a computing environment, in accordance with certain described implementations of the invention.

FIG. 1 illustrates a block diagram of a computing environment, in accordance with certain implementations of the invention. A host 100 is coupled to a storage unit, such as, a first storage control unit 102, where the host 100 may sent input/output (I/O) requests to the first storage control unit 102. The first storage control unit 102 may send the I/O requests to one or more other storage units, such as, second storage control unit 104, where in certain embodiments the second storage control unit 104 may be coupled to another host 106. Although only two storage control units 102 and 104 are shown, certain embodiments may include a greater or a fewer number of storage control units. Furthermore, while only single hosts 100, 106 are shown coupled to the first and second storage control units 102, 104 respectively, in other embodiments a plurality of hosts may be coupled to each of the first and second storage control unit 102, 104. The hosts 100, 106 may be any computational device known in the art, such as a personal computer, a workstation, a server, a mainframe, a hand held computer, a palm top computer, a telephony device, network appliance, etc.

The storage control units 102, 104 may each include one or more storage subsystems (not shown). In certain embodiments, the storage subsystems may be computational devices that include storage volumes (not shown) configured as a Direct Access Storage Device (DASD), one or more RAID ranks, Just a bunch of disks (JBOD), or any other data repository system known in the art.

In certain embodiments, the first storage control unit 102 and the second storage control unit 104 are coupled by a fibre channel data interface mechanism. In other embodiments, different data interface mechanisms may be used to couple the first storage control unit 102 to the second storage control unit 104. In embodiments where the first storage control unit 102 and the second storage control unit 104 are coupled by a fibre channel data interface mechanism, the storage control units 102, 104 may be coupled to one or more fibre channel adapters. For example, the first storage control unit 102 may be coupled to a first fibre channel adapter 108, and the second storage control unit 104 may be coupled to a second fibre channel adapter 110. In alternative implementations, adapters that are different from fibre channel adapters 108, 110 may be used.

In some embodiments, a fabric, such as, a switched fabric 112, may couple the first fibre channel adapter 108 coupled to the first storage control unit 102, to the second fibre channel adapter 110 coupled to the second storage control unit 104. Therefore, in certain embodiments the first storage control unit 102 and the second storage control unit 104 can communicate via the fibre channel adapters 108, 110 and the switched fabric 112.

In certain embodiments, the switched fabric 112 include one or more switches. I/O requests between the first and second storage control units 102, 104 may be sent over fibre channel adapters 108, 110 coupled to the switched fabric 112. In alternative embodiments, a point-to-point connection between the first fibre channel adapter 108 and the second fibre channel adapter 110 may replace the switched fabric 112. In yet additional embodiments, the first fibre channel adapter 108 and the second fibre channel adapter 110 may be coupled in other ways besides a switched fabric or a point-to-point connection.

The first and second fibre channel adapters 108, 110 may include bidirectional data transfer applications 114, 116 that can perform bidirectional data transfer between the first and storage control units 102, 104. For example, the first bidirectional data transfer application 114 that is included in the first fibre channel adapter 108 may send an I/O command to the second storage control unit 104 via the switched fabric 112 and the second fibre channel adapter 110, and at the same time receive another I/O command from the second storage control unit 104 via the second fibre channel adapter 110 and the switched fabric 112. In additional embodiments, the second bidirectional data transfer application 116 that is included in the second fibre channel adapter 110 may send an I/O command to the first storage control unit 104 via the switched fabric 112 and the first fibre channel adapter 108, and at the same time receive another I/O command from the first storage control unit 102 via the first fibre channel adapter 108 and the switched fabric 112.

Therefore, FIG. 1, illustrates a computing environment in which bidirectional data transfer applications 114, 116 can perform bidirectional data transfer between the first and storage control units 102, 104 across a fibre channel link.

Figure 2:
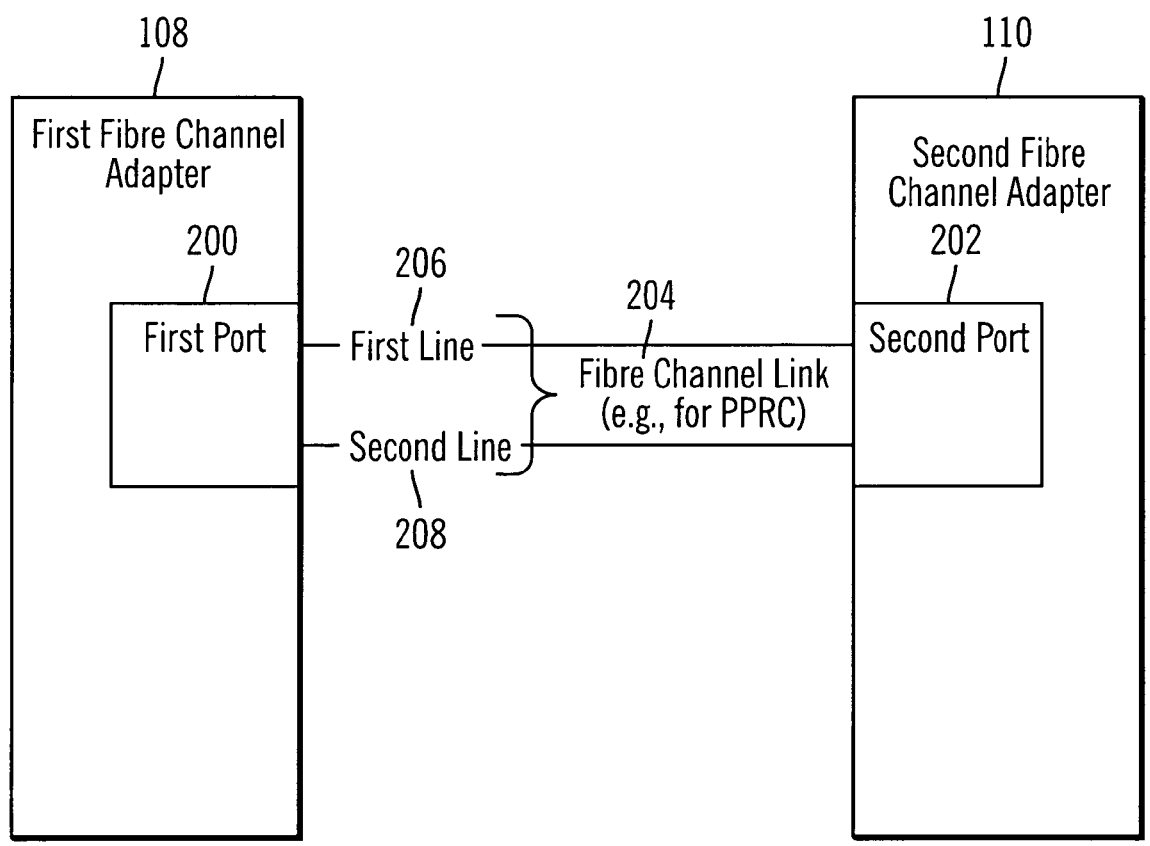
FIG. 2 illustrates a block diagram of bidirectional data transfer between fibre channel adapters, in accordance with certain described implementations of the invention.

FIG. 2 illustrates a block diagram of bidirectional data transfer between the first fibre channel adapter 108 and the second fibre channel adapter 110, in accordance with certain implementations of the invention.

In certain embodiments, each of the fibre channel adapter 108, 110 may include a plurality of ports, where the ports may be used for bidirectional data transfer between the fibre channel adapters 108, 110. For example, the first fibre channel adapter 108 may include a first port 200 and the second fibre channel adapter 110 may include a second port 202.

The first port 200 and the second port 202 may be coupled by a fibre channel link 204, where the fibre channel link 204 is comprised of a first line 206 and a second line 208. The first and second lines 206, 208 allow for a bidirectional data transfer between the first and second ports 200, 202 via two different data paths. For example, in certain embodiments if the first line 206 of the fibre channel link 204 is used to send data from the first port 200 to the second port 202, the second line 208 of the fibre channel link 204 may be used to send data from the second port 202 to the first port 200. In certain embodiments, the first and second ports 200, 202 allow the first and second bidirectional data transfer applications 114, 116 to transfer data bidirectionally between the first and second storage control units 102, 104. In certain embodiments, the port that sends data may be referred to as the primary port and the port that receives data may be referred to as the secondary port.

Therefore, FIG. 2 illustrates certain embodiments, in which a first port 200 in a first fibre channel adapter 108 and a second port 202 in a second fibre channel adapter 110 transfer data bidirectionally between the first and second fibre channel adapters 108, 110. The bidirectional data transfer may take place over a fibre channel link 204. In certain embodiments of the invention the fibre channel link 204 may be a PPRC link for peer-to-peer remote copy between the first and second storage control units 102, 104.

Figure 3:
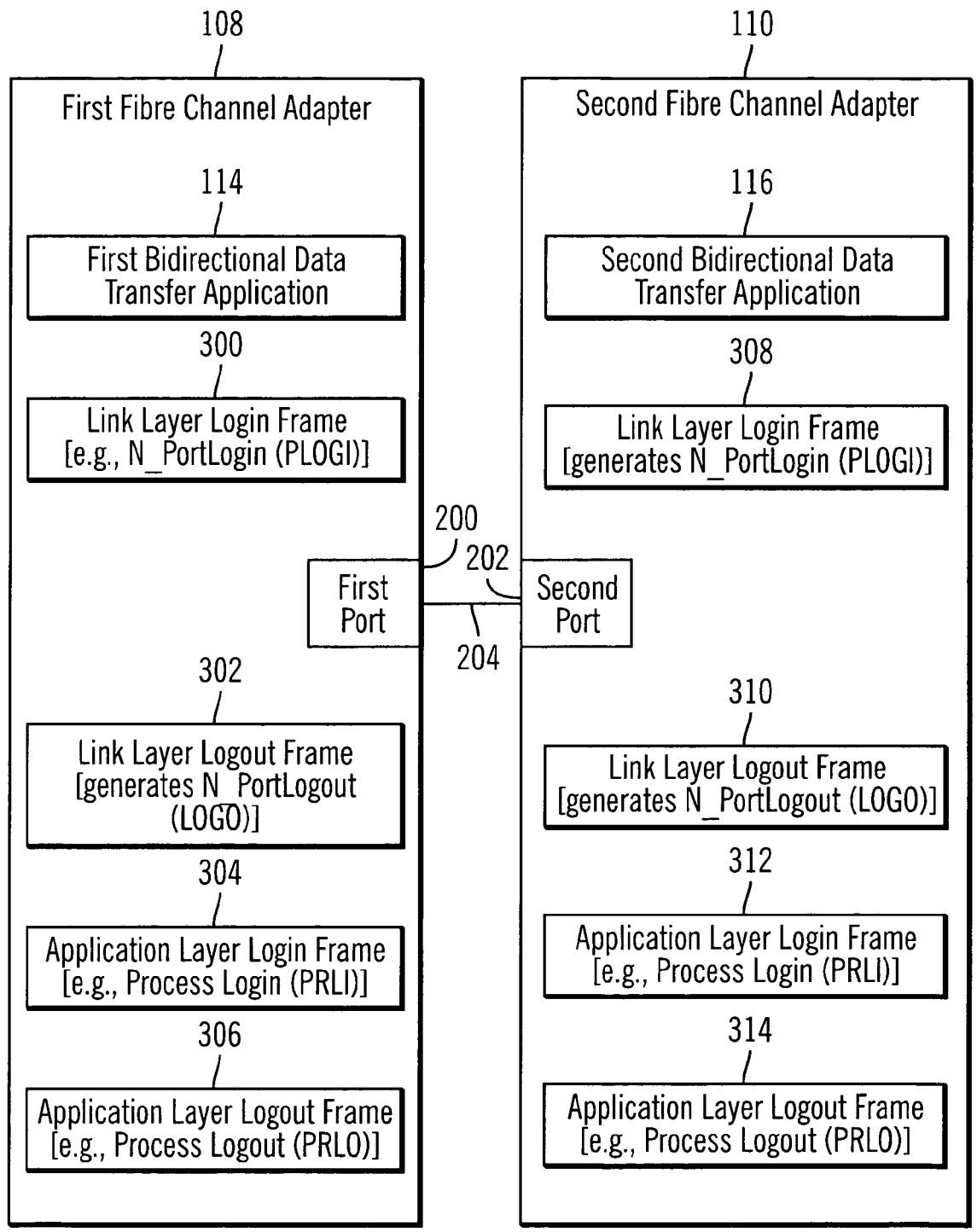
FIG. 3 illustrates a block diagram of data structures and applications implemented in fibre channel adapters, in accordance with certain described implementations of the invention.

FIG. 3 illustrates a block diagram of data structures and applications implemented in the fibre channel adapters 108, 110, in accordance with certain implementations of the invention.

Each of the fibre channel adapters 108, 110 may include data structures corresponding to a link layer login frame, a link layer logout frame, an application layer login frame, and an application layer logout frame. For example, in addition to the first bidirectional data transfer application 114, the first fibre channel adapter 108 may include data structures corresponding to a link layer login frame 300, a link layer logout frame 302, an application layer login frame 304, and an application layer logout frame 306. The second fibre channel adapter 110 may, in addition to the second bidirectional data transfer application 116, include data structures corresponding to a link layer login frame 308, a link layer logout frame 310, an application layer login frame 312, and an application layer logout frame 314.

In communications, a link is a line or channel over which data is transmitted, and in certain embodiments a link level communications protocol (not shown) is implemented to communicate over the fibre channel link 204. An application level communications protocol (not shown) is implemented at a level higher than the link level communications protocol.

In certain embodiments, the link level login frames 300, 308 and the link level logout frames 302, 310 communicate using the link level communications protocol between the first fibre channel adapter 108 and the second fibre channel adapter 110. Additionally, the application layer login frames 304, 312 and the application layer logout frames 306, 312 may communicate by using the application level communications protocol between the first fibre channel adapter 108 and the second fibre channel adapter 110.

The link layer login frames 300, 308 may also be referred to as N_PortLogin or PLOGI and the link layer logout frames 302, 310 may also be referred to as N_PortLogout or LOGO. The application layer login frames 304, 312 may also be referred to as process login or PRLI and the application layer logout frames may also be referred to as process logout or PRLO.

In the fibre channel protocol, in response to an link layer login frame being transmitted from a port of a fibre channel adapter to a port of a different fibre channel adapter, a login relationship is established between the two ports. For example, if the first port 200 sends a link layer login frame 300 to the second port 302, then the first port 200 considers the second port 202 to be logged on to the first port 200, and the second port 202 considers the first port 200 to be logged on to the second port 202. Therefore, in the fibre channel protocol if a link layer login frame is transmitted from one port to another, both ports are mutually logged in to each other regardless of which port transmitted the link layer login frame. However, if either of the two mutually logged in ports ever sent another link layer login frame or link layer logout frame, then in the fibre channel protocol both mutually logged in ports would be logged out. In such a case, if bidirectional data transfer were taking place prior to logout, both lines of the bidirectional data transfer may stop transferring data.

Certain embodiments of the invention allow the fibre channel adapters 108, 110 to manage the concurrent application layer login frames 304, 312 independently of one another, and still follow the correct fibre channel protocol for the link layer login frames 300, 308, such that, bidirectional data transfer can take place between the fibre channel adapters 108, 110. Some embodiments also provide a way to handle the application layer logout frames 306, 314 and the link layer logout frames 302, 310, such that, one port can perform logout without affecting the operation of both lines of a bidirectional data transfer.

Therefore, FIG. 3 illustrates certain embodiments in which the bidirectional data transfer applications 114, 116 handle link layer login frames 300, 308, link layer logout frames 302, 310, application layer login frames 304, 312, and application layer logout frames 306, 314 to allow for bidirectional data transfer across the single fibre channel link 204 between the fibre channel adapters 108, 110.

Figure 4:
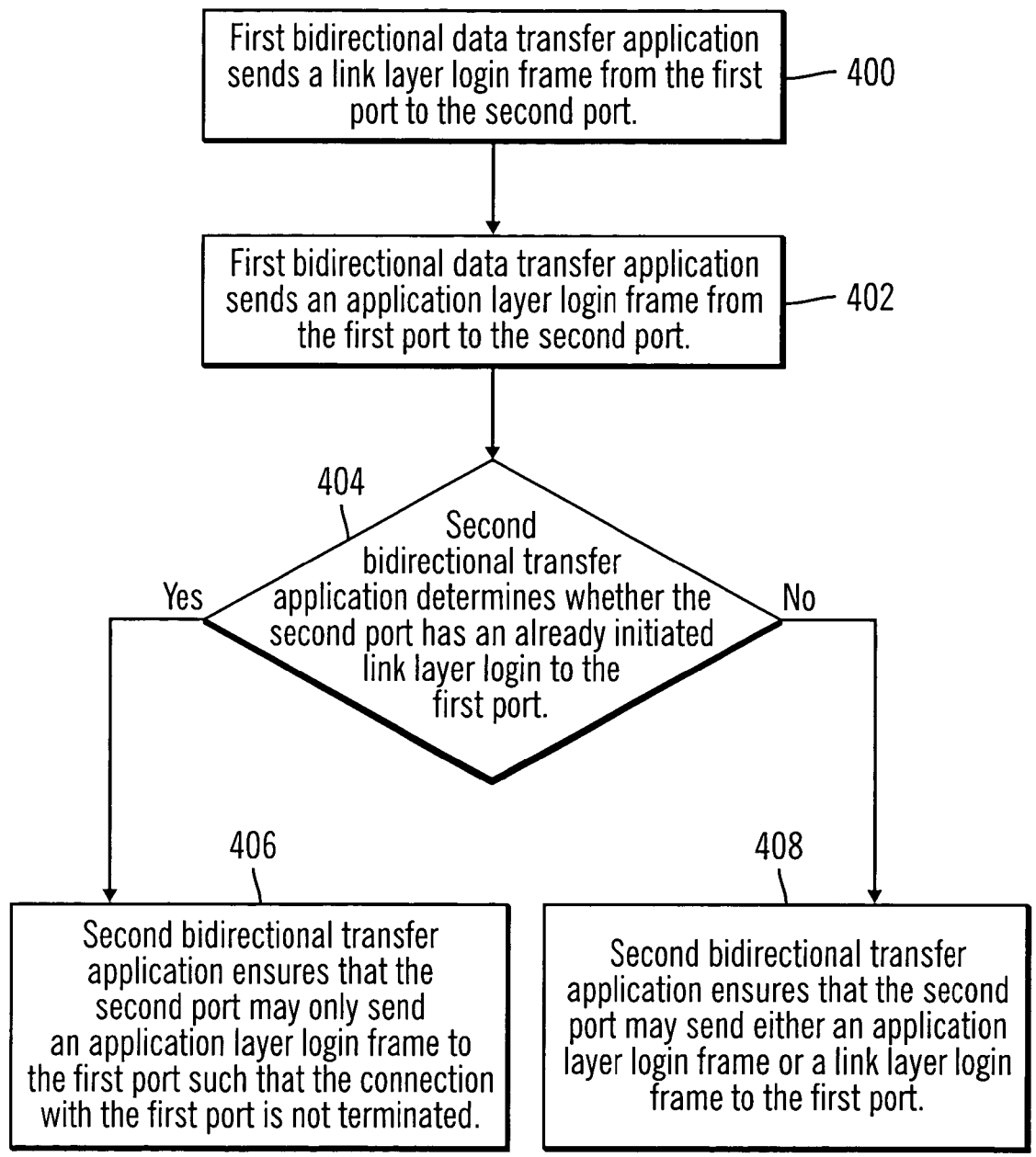
FIG. 4 illustrates logic for handling logins in fibre channel adapters, in accordance with certain described implementations of the invention.

FIG. 4 illustrates logic for handling logins in fibre channel adapters 108, 110, in accordance with certain implementations of the invention.

Control starts at block 400, where the first bidirectional data transfer application 114 sends a link layer login frame 300 from the first port 200 to the second port 202. The first bidirectional data transfer application then sends (at block 402) an application layer login frame 304 from the first port 200 to the second port 202 to establish a login connection from the first port to the second port.

At a subsequent time that need not be immediately at the conclusion of the execution of block 402, the second bidirectional data transfer application 116 determines (at block 404) whether the second port 202 has an already initiated link layer login to the first port 200. If so, then the second bidirectional data transfer application 116 ensures that the second port 202 may send only an application layer login frame 312, such that, the established login connection from the first port 200 to the second port 202 is not terminated. In fibre channel protocols, if a link layer login frame were to be sent from one port to another and a link layer login connection already existed between the two ports, the existing link layer login connection would be terminated. Therefore, by not sending (at block 406) a link layer login frame and ensuring that only an application layer login frame is sent (at block 406) the established login connections are not terminated. At the conclusion of block 406, bidirectional data transfer may take place between ports 200, 202.

If the second bidirectional data transfer application 116 determines (at block 404) that the second port 202 does not have an already initiated link layer login to the first port 200, then the second bidirectional data transfer application 116 ensures (at block 408) that the second port 202 may send either an application layer login frame 312 or a link layer login frame 308 to the first port 200.

Therefore, the embodiments restrict the second port 202 from sending the link layer login frame 308 to the first port 200, in response to determining that the second port 202 has an initiated link layer login to the first port 200. Restricting the second port 202 from sending the link layer login frame 308 to the first port 200 causes a retention of an established data path from the first port to the second port. If the second port 202 sends an application layer login frame 312, then bidirectional data transfer can take place between the first and second ports 200, 202.

Therefore, the logic of FIG. 4 illustrates an embodiment in which the first and second bidirectional data transfer applications 114, 116 may coordinate to arrange for logins with each other without terminating existing logins in a bidirectional data transfer mechanism.

Figure 5:
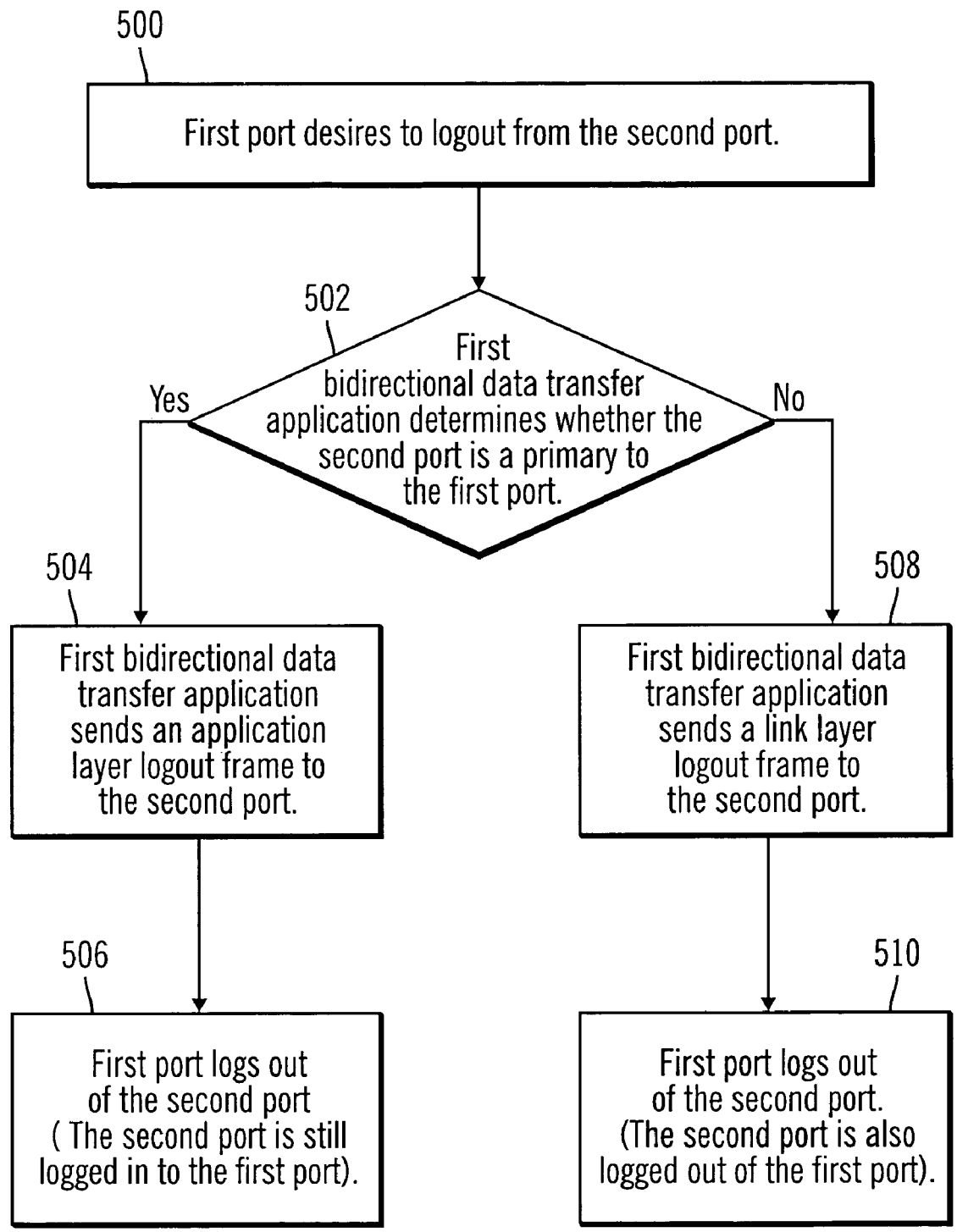
FIG. 5 illustrates logic for handling logouts in fibre channel adapters, in accordance with certain described implementations of the invention.

FIG. 5 illustrates logic for handling logouts in fibre channel adapters 108, 110, in accordance with certain implementations of the invention.

Prior to control block 500, the first port 200 and the second port 202 are in bidirectional communication with each other, when the first port 200 desires (at block 500) to logout from the second port 202. The embodiments allow the first port 200 to logout from the second port 202 without logging out the second port 202 from the first port 200.

The first bidirectional data transfer application 114 determines (at block 502) whether is second port 202 is a primary to the first port 200, i.e., the second port 202 has already logged in to the first port 200. If so, then the first bidirectional data transfer application 114 sends (at block 504) an application layer logout frame 306 to the second port 202. As a result, the first port 200 logs out (at block 506) of the second port 202. However, the second port 202 is logged in to the first port 200 at the conclusion of the execution of block 506. Therefore, certain embodiments allow bidirectional data transfer between the first port 200 and the second port 202.

If the first bidirectional data transfer application 114 determines (at block 502) that the second port 202 is not a primary to the first port 200, i.e., the second port 202 has not already logged in to the first port 200, then the first bidirectional data transfer application 114 sends (at block 508) the link layer logout frame 302 to the second port 202. As a result, the first port logs out (at block 510) of the second port 202. The second port 202 is also logged out of the first port 200.

Therefore, FIG. 5 illustrates an embodiment in which the bidirectional data transfer applications 114, 116 use application layer logouts 306, 312 to perform logout in one line of a bidirectional fibre channel link 204 without forcing a logout on the other line of the bidirectional fibre channel link 204, as would be the case if a link layer logout 302, 310 was used instead of the application layer logout 306, 312.

FIG. 6 illustrates a block diagram that includes certain possible states of ports 200, 202, in accordance with certain implementations of the invention.

The entries of a table 600 indicate the old state 604 and the new state 606 of a port, such as ports 200, 202, in response to the completion of a corresponding event 602. A port may receive a link layer logout frame in an event 608, an application layer logout frame in an event 610, a link layer login frame in an event 612, an application layer login frame in an event 614, or an event 616 that indicates that the fibre channel link 204 is down.

A port, such as ports 200, 202, may be in one of the following five states:

(i) not logged in state, i.e., the port is not logged in to another port (reference numeral 618);

(ii) PLOGI state, i.e., the port is only in a link level login with respect to another port (reference numeral 620);

(iii) PRLI as primary state, i.e., the port is coupled to a line in which the port is a primary port that has performed an application level login to a secondary port (reference numeral 622);

(iv) PRLI as secondary state, i.e., the port is coupled to a line in which the port is a secondary port to which a primary port has performed an application level login (reference numeral 624); and (v) PRLI as primary/secondary, i.e., the port is coupled to a line in which the port is a primary port that has performed an application level login to a secondary port, and the port is coupled to another line in which the port is a secondary port to which a primary port has performed an application level login (reference numeral 626).

FIG. 6 is provides additional clarification of certain embodiments by indicating possible states of the ports in response to possible events. However, not all possible combinations of events and states are allowed by the logic of the embodiments illustrated in FIGS. 4 and 5.

The entries of the table 600 can be used to determine state changes in response to certain events 608, 610, 612, 614, 616. For example, reference numeral 628 may indicate that the second port 202 is in a PLOGI state, i.e., the second port is in a link level login with respect to the first port. On receiving an event 614 which is an application layer login frame 304 from the first port 200, the second port 202 may change to a PRLI as secondary state, i.e., the second port 202 is coupled to a line in which the second port is a secondary port to which the first port 200 (the primary port) has performed an application level login.

Therefore, FIG. 6 illustrates possible state changes of ports in a fibre channel environment in response to receiving certain events. The embodiments may restrict certain events from being generated at certain states of ports (as illustrated in the logic of FIGS. 4 and 5) and allow bidirectional transfer of data across the fibre channel link 204.

The embodiments have been described with one port per fibre channel adapter. In alternative implementations, a single fibre channel adapter with one or more ports may perform bidirectional data transfer from one plurality of storage control units to another plurality of storage control units. While frames have been used in the embodiments, in alternative embodiments may use other data transmission units besides frames. Furthermore, the embodiments may also be implemented in networks that are not based on fibre channel. Additionally, in alternative implementations the bidirectional data transfer applications 114 and 116 may be implemented in the storage control units 102, 104 and control the operations of the fibre channel adapters 108, 110.

The embodiments allow for bidirectional data transfer via a single fibre channel link that couples two storage control units. In embodiments of the invention, both lines of the single fibre channel link may be simultaneously used for data transfer. In certain embodiments implemented in a fibre channel PPRC environment, peer storage control units may participate in a PPRC relationship and perform bidirectional data transfer. At each end of a PPRC link, the same fibre channel adapter may concurrently function as a PPRC primary and a PPRC secondary. The embodiments allow for less cost and maintenance than would be required for two separate fibre channel links, and can fully utilize along an entire fibre channel link the full duplex nature of fibre channel.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 7:
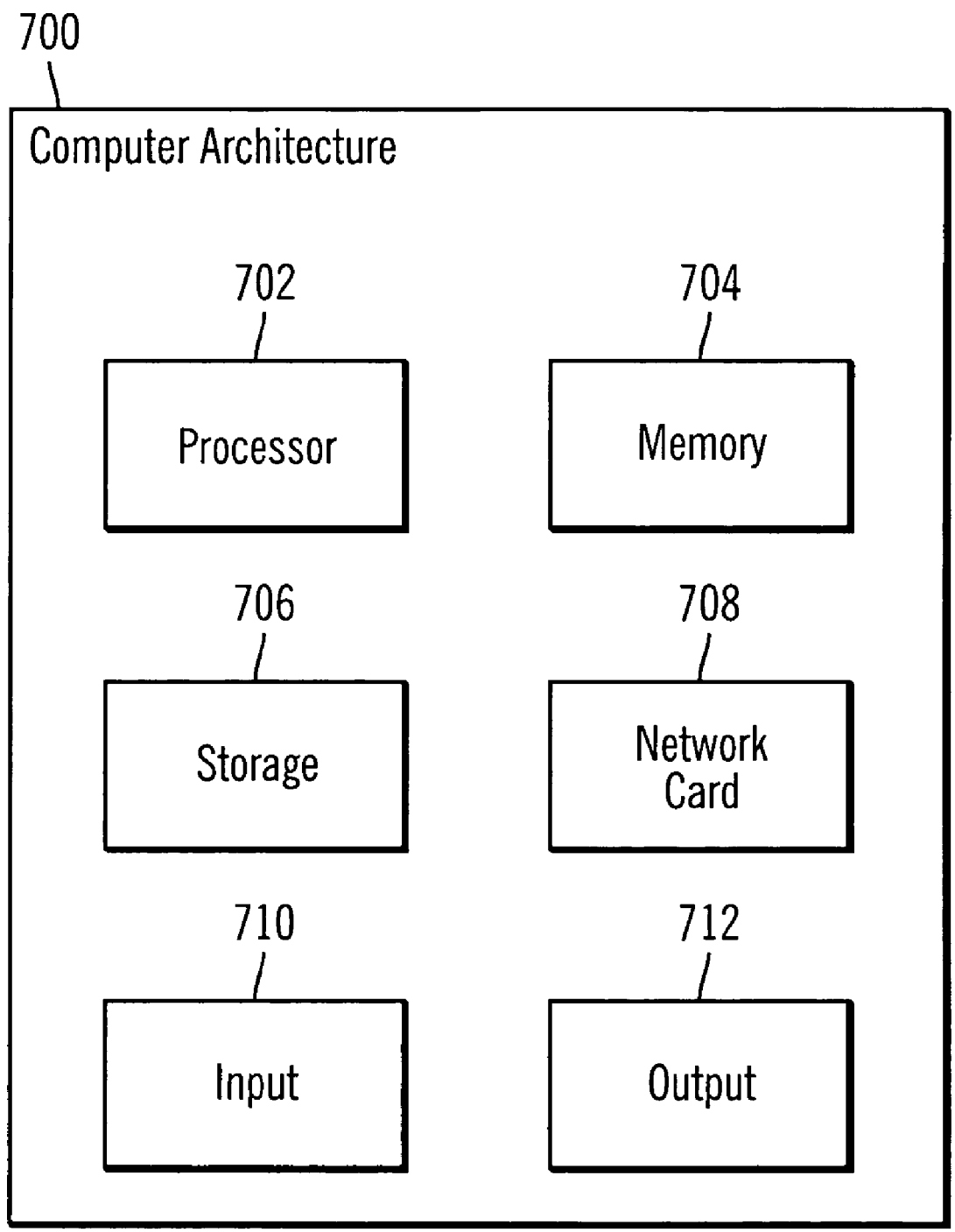
FIG. 7 illustrates a block diagram of a computer architecture in which certain described aspects of the invention are implemented.

FIG. 7 illustrates a block diagram of a computer architecture in which certain aspects of the invention are implemented. FIG. 7 illustrates one implementation of the hosts 100, 106, the storage control units 102, 104 and certain implementations of the fibre channel adapters 108, 110. Not all elements illustrated in FIG. 7 are required to be present in all of the hosts 100, 106, the storage control units 102, 104 and the fibre channel adapters 108, 110. The hosts 100, 106, the storage control units 102, 104 and certain implementations of the fibre channel adapters 108, 110 may implement a computer architecture 600 having a processor 602, a memory 604 (e.g., a volatile memory device), and storage 606 (e.g., a non-volatile storage, magnetic disk drives, optical disk drives, tape drives, etc.). The storage 606 may comprise an internal storage device, an attached storage device or a network accessible storage device. Programs in the storage 606 may be loaded into the memory 604 and executed by the processor 602 in a manner known in the art. The architecture may further include a network card 608 to enable communication with a network. The architecture may also include at least one input 610, such as a keyboard, a touchscreen, a pen, voice-activated input, etc., and at least one output 612, such as a display device, a speaker, a printer, etc.

The logic of FIGS. 4 and 5 describes specific operations occurring in a particular order. Further, the operations may be performed in parallel as well as sequentially. In alternative implementations, certain of the logic operations may be performed in a different order, modified or removed and still implement implementations of the present invention. Moreover, steps may be added to the above described logic and still conform to the implementations. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method, comprising:

sending a link layer login from a first port to a second port;

subsequently, sending an application layer login from the first port to the second port to establish a first data path, wherein the first data path is from the first port to the second port; and subsequently, sending another application layer login from the second port to the first port to establish a second data path, wherein the second data path is from the second port to the first port, wherein a bidirectional data transfer application prevents the second port from sending another link layer login to the first port, wherein sending the another link layer login would cause a termination of the first data path.

2. The method of claim 1, further comprising:

restricting the second port to sending the another application layer login to the first port in response to determining that the second port has an initiated link layer login to the first port, wherein restricting the second port causes a retention of the established first data path from the first port to the second port, and wherein restricting the second port and sending the another application layer login causes bidirectional data transfer to take place between the first and second ports.

3. The method of claim 1, wherein the method is performed by one or more bidirectional data transfer applications that are implemented in first and second fibre channel adapters coupled to the first and second ports respectively, wherein the first and second fibre channel adapters are coupled to first and second storage controllers respectively, and wherein the first and second ports are coupled via one fibre channel link associated with the first and second data paths.

4. A method, comprising:

sending a link layer login from a first port to a second port;

subsequently, sending an application layer login from the first port to the second port to establish a first data path, wherein the first data path is from the first port to the second port; and subsequently, sending another application layer login from the second port to the first port to establish a second data path, wherein the second data path is from the second port to the first port, wherein the method further comprises:
  (i) determining that the second port has an initiated link layer login to the first port, prior to sending the another application layer login from the second port to the first port; and
  (ii) restricting the second port from sending another link layer login to the first port, wherein sending the another link layer login would cause a termination of the established first data path from the first port to the second port.

5. A method, comprising:
establishing a first data path from a first port to a second port;
determining, at the first port, whether the second port has a second data path established from the second port to the first port;
sending an application layer logout, from the first port to the second port, in response to determining that the second port has the second data path established from the second port to the first port; and
terminating the first data path from the first port to the second port in response to receiving the application layer logout at the second port, wherein a bidirectional data transfer application prevents the first port from sending a link layer logout to the second port, wherein sending the link layer logout would cause a termination of the first and second data paths.

6. The method of claim 5, wherein terminating the first data path from the first port to the second port does not terminate the second data path from the second port to the first port.

7. The method of claim 5, wherein the method is performed by one or more bidirectional data transfer applications that are implemented in first and second fibre channel adapters coupled to the first and second ports respectively, wherein the first and second fibre channel adapters are coupled to first and second storage controllers respectively, and wherein the first and second ports are coupled via one fibre channel link associated with the first and second data paths.

8. The method of claim 5, wherein the application level logout is sent via an application level logout frame, and wherein the first and second ports are capable of sending and receiving a link level login frame, a link level logout frame, an application level login frame and the application level logout frame over a fibre channel connection coupling the first and second ports.

* * * * *